United States Patent
Frank et al.

(10) Patent No.: US 12,394,968 B2
(45) Date of Patent: Aug. 19, 2025

(54) MANUFACTURING AN ELECTRICAL DEVICE

(71) Applicant: Vitesco Technologies GmbH, Regensburg (DE)

(72) Inventors: Sebastian Frank, Munich (DE); Loïc Bertrand, Munich (DE); Aurélien Fraysse, Munich (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 166 days.

(21) Appl. No.: 17/911,493

(22) PCT Filed: Mar. 4, 2021

(86) PCT No.: PCT/EP2021/055444
§ 371 (c)(1),
(2) Date: Sep. 14, 2022

(87) PCT Pub. No.: WO2021/185587
PCT Pub. Date: Sep. 23, 2021

(65) Prior Publication Data
US 2023/0101845 A1 Mar. 30, 2023

(30) Foreign Application Priority Data
Mar. 19, 2020 (DE) ............. 10 2020 203 528.8

(51) Int. Cl.
*H02G 15/18* (2006.01)
*H02G 1/14* (2006.01)
(Continued)

(52) U.S. Cl.
CPC ......... *H02G 15/1806* (2013.01); *H02G 1/145* (2013.01); *H02G 1/16* (2013.01); *H02G 15/003* (2013.01); *H02G 15/04* (2013.01)

(58) Field of Classification Search
CPC .. H02G 15/1806; H02G 1/145; H02G 15/003; H02G 15/04; H02G 15/10;
(Continued)

(56) References Cited

U.S. PATENT DOCUMENTS 5,380,224 A    1/1995   DiCicco .................. 439/610
7,128,739 B2 * 10/2006  Prakash ................ A61B 18/18
                                                606/41

(Continued)

FOREIGN PATENT DOCUMENTS

DE        196 13 228       10/1997  .......... H01R 13/502
DE    10 2008 009 620       8/2009  .......... H01R 13/52
(Continued)

OTHER PUBLICATIONS

Search Report for International Application No. PCT/EP2021/055444, 12 pages, May 20, 2021.
(Continued)

*Primary Examiner* — Donghai D Nguyen
(74) *Attorney, Agent, or Firm* — Slayden Grubert Beard PLLC

(57) ABSTRACT

Various embodiments of the teachings herein include an electrical device comprising: a cable wire; a cable insulation arranged around the cable wire such that a section of the cable wire at least partially longitudinally protrudes out of the cable insulation; a heat-shrink tube at least partially arranged around the cable insulation and at least partially around the section of the cable wire; and a sealing material at least partially inside the cable insulation thereby sealing any gaps between the cable wire and the cable insulation.

6 Claims, 2 Drawing Sheets

(51) Int. Cl.
*H02G 1/16* (2006.01)
*H02G 15/00* (2006.01)
*H02G 15/04* (2006.01)

(58) Field of Classification Search
CPC ..... H05B 3/06; A61B 18/18; Y10T 29/49176; Y10T 29/49195
See application file for complete search history.

(56) References Cited

U.S. PATENT DOCUMENTS

| | | | | |
|---|---|---|---|---|
| 7,635,813 | B2* | 12/2009 | Taylor | H02G 15/24 |
| | | | | 174/93 |
| 10,012,336 | B2* | 7/2018 | Häckel | H05B 3/06 |
| 10,256,619 | B2* | 4/2019 | Takahashi | H02G 15/003 |
| 2016/0172073 | A1 | 6/2016 | Aishima | H01B 3/28 |
| 2017/0141557 | A1 | 5/2017 | Wimmer | H02G 15/04 |
| 2018/0331528 | A1 | 11/2018 | Takahashi | |
| 2019/0221981 | A1 | 7/2019 | Schneider | H01R 73/00 |

FOREIGN PATENT DOCUMENTS

| | | | | |
|---|---|---|---|---|
| JP | 2003 086266 | | 3/2003 | H01R 4/70 |
| JP | 6142807 | | 7/2015 | H01B 7/00 |
| WO | 2013 072715 | | 5/2013 | H04B 1/707 |
| WO | 2013/073715 | A1 | 5/2013 | H01B 7/282 |

OTHER PUBLICATIONS

Office Action for DE Patent Application No. 10 2020 203 528.8, 6 pages, Nov. 23, 2020.
Alpha Wire: "Heat-Shrink Tubing: The Versatile Tools for Maintenance and Repair" XP055335959, 7 pages, Date 2009.
Chinese Office Action, Application No. 202180022334.7, 14 pages, Mar. 1, 2025.

* cited by examiner

MANUFACTURING AN ELECTRICAL DEVICE

CROSS-REFERENCE TO RELATED APPLICATIONS

This application is a U.S. National Stage Application of International Application No. PCT/EP2021/055444 filed Mar. 4, 2021, which designates the United States of America, and claims priority to DE Application No. 10 2020 203 528.8 filed Mar. 19, 2020, the contents of which are hereby incorporated by reference in their entirety.

TECHNICAL FIELD

The present disclosure relates to electrical devices. Various embodiments of the teachings herein include method for manufacturing electrical devices and/or electrical devices with improved sealing properties.

BACKGROUND

Electrical devices may include cable wires extending through a cable insulation. Thermoset overmolding of electronics is used in the automotive industry. These automotive industry applications require a tight electrical connection for ensuring a long life of the electrical device. Currently, printed circuit boards (PCB) may be directly contacted with a cable wire and, then, for sealing, a thermoset material is overmolded for sealing the whole arrangement.

Problems associated with the known techniques include bad adhesion properties of the overmolding material at the cable insulation housing the cable wire. This may lead to creeping of the ambient medium along a gap between the overmolding material and the cable insulation which decreases the overall tightness significantly. In addition, clamping forces of any overmold tooling may damage the cable insulation and/or the cable wires. Further, sharp edges and/or rims of the thermoset overmolding element may lead to abrasion of the cable insulation due to wear.

Further, the high creeping capability of the very low viscous thermoset overmolding material may creep into any gaps between the cable wire and cable insulation. Said creeping and curing of the thermoset overmolding material within said gaps may increase the overall brittleness of the cable arrangement.

SUMMARY

The teachings of the present disclosure include electrical devices with improved sealing properties and which may ensure its functionalities over a very long time. For example, some embodiments include an electrical device (100), comprising: at least one cable wire (110); a cable insulation (120) arranged around the at least one cable wire (110) such that a section of the at least one cable wire (110) at least partially longitudinally protrudes out of the cable insulation (120); a heat-shrink tube (130) at least partially arranged around the cable insulation (120) and at least partially around the section of the at least one cable wire (110) protruding out of the cable insulation (120); and a sealing material (140) at least partially provided inside the cable insulation (120) thereby sealing any gaps between the at least one cable wire (110) and the cable insulation (120).

In some embodiments, there is a sealing element (150) arranged at least partially around the heat-shrink tube (130) and at least partially around the section of the at least one cable wire (110) protruding out of the cable insulation (120), the sealing element (150) being formed by a thermoset overmolding process.

In some embodiments, there is an electronic assembly (160) embedded within the sealing element (150) and electrically connected the at least one cable wire (110).

In some embodiments, the sealing material (140) is adapted to be at least partially solid after curing.

In some embodiments, the sealing material is a hotmelt adhesive, wax or grease.

In some embodiments, the heat-shrink tube (130) is heat-shrunk by applying heat to the heat-shrink tube.

In some embodiments, an inner layer of the heat-shrink tube (130) is at least partially covered with the sealing material (140).

As another example, some embodiments include a method for manufacturing an electrical device (100), comprising: providing at least one cable wire (110) and a cable insulation (120) arranged around the at least one cable wire (110) such that a section of the at least one cable wire (110) at least partially longitudinally protrudes out of the cable insulation (120); providing a heat-shrink tube (130) at least partially around the cable insulation (120) and at least partially around the section of the at least one cable wire (110) protruding out of the cable insulation (120); providing a sealing material (140) at least partially within the heat-shrink tube (130); and applying heat to the heat-shrink tube (130) such that the heat-shrink tube (130) at least partially shrinks thereby forcing the sealing material (140) into the cable insulation (120) for sealing any gaps between the at least one cable wire (110) and the cable insulation (120).

In some embodiments, the method includes thermoset overmolding the heat-shrink tube (130) and the section of the at least one cable wire (110) protruding out of the cable insulation (120) thereby forming a sealing element (140).

In some embodiments, the method includes: providing at least one electrical conductor within the sealing element (140); and electrically connecting the at least one conductor with the at least one cable wire (110).

In some embodiments, the sealing material (140) is adapted to be at least partially solid after curing.

In some embodiments, the sealing material is a hotmelt adhesive, wax or grease.

In some embodiments, the step of applying heat to the heat-shrink tube (130) includes applying heat to the heat-shrink tube (130) of a temperature in a range from about 90° C. to about 250° C.

In some embodiments, an inner layer of the heat-shrink tube (130) is at least partially covered with the sealing material (140).

BRIEF DESCRIPTION OF THE DRAWINGS

Further features and aspects of the teachings of the present disclosure will become apparent to those ordinary skilled in the art by studying and executing the present disclosure and by consideration of the appended drawings, in which.

DETAILED DESCRIPTION

Figure 1:
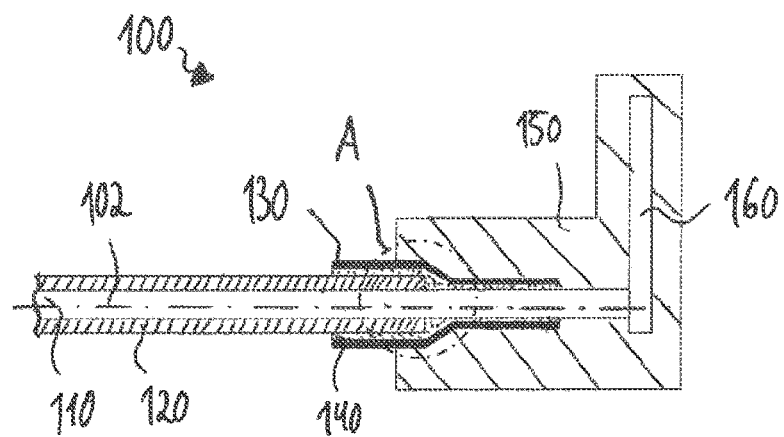
FIG. 1 shows a sectional view of an exemplary electrical device incorporating teachings of the present disclosure.

Providing a heat-shrink tube at a cable wire insolated with a cable insulation and filling that heat-shrink tube with a filling material may improve the sealing capabilities of the whole arrangement. In particular, mounting the heat-shrink tube filled with the sealing material to the cable wire insulated within the cable insulation and, then, applying heat to the heat-shrink tube may at least partially shrink the tube and, thus, shrinking of the tube may lead to forcing the filling material into any gaps between the cable insulation and the cable wire. This can be particularly advantageous in a case when the cable wire connects to a printed circuit board which is then embedded in a thermoset material, such as, for instance, a thermosetting polymer, e.g. polyester resin, phenol-formaldehyde Resin, epoxy resin, bulkmolding compound, etc., via a thermoset overmolding process.

In some embodiments, an electrical device comprises at least one cable wire, a cable insulation arranged around the at least one cable wire such that a section of the at least one cable wire at least partially longitudinally protrudes out of the cable insulation, a heat-shrink tube at least partially arranged (in a longitudinal direction) around the cable insulation and at least partially arranged (in a longitudinal direction) around the section of the at least one cable wire protruding out of the cable insulation, and a sealing material at least partially provided inside the cable insulation thereby sealing any gaps between the cable insulation and the at least one cable wire.

In some embodiments, the electrical device may further comprise a sealing element arranged (in a longitudinal direction) at least partially around the heat-shrink tube and at least partially around the section of the at least one cable wire protruding out of the cable insulation. The sealing element may be formed by a thermoset overmolding process.

The sealing material which may be forced by heat-shrinking the heat-shrink tube into any gaps between the cable insulation and the at least one cable wire may prevent any thermoset material applied to the electric device via said thermoset overmolding process from creeping into said gaps between the at least one cable wire and the cable insulation.

In some embodiments, the electrical device may further comprise an electronic assembly embedded within the sealing element and electrically connected to the at least one cable wire. For instance, the electronic assembly may be a printed circuit board having electrical conductors which may be connected to the at least one cable wire.

In some embodiments, the sealing material is adapted to be at least partially solid after curing, but to be at least partially liquid prior curing. After curing, the sealing material is configured to remain an elasticity which is suitable for ensuring at least some flexibility of the at least one cable wire and/or cable insulation without the risk of any damage to the at least one cable wire and/or the cable insulation. For instance, the viscosity of the sealing material after curing may be in a range from about 10 k mPas to about 20 k mPas, from about 13 k mPas to about 17 k mPas, or about 15 k mPas.

In some embodiments, the sealing material is a hotmelt adhesive, glue, wax or grease. In some embodiments, the heat-shrink tube is heat-shrunk by applying heat to the heat-shrink tube via, for example, a hot air gun, infrared lights, an oven, inserting in a preheated thermoset mold, etc.

In some embodiments, an inner layer of the heat-shrink tube is at least partially covered with the sealing material prior mounting the heat-shrink tube to the cable insulation.

In some embodiments, a method for manufacturing an electrical device comprises providing at least one cable wire and a cable insulation arranged around the at least cable wire such that a section of the at least one cable wire at least partially longitudinally protrudes out of the cable insulation, providing (in a longitudinal direction) a heat-shrink tube at least partially around the cable insulation and at least partially around the section of the at least one cable wire protruding out of the cable insulation, providing a sealing material at least partially within the heat-shrink tube, and applying heat to the heat-shrink tube such that the heat-shrink tube at least partially shrinks thereby forcing the sealing material into the cable insulation for sealing any gaps between the cable insulation and the at least one cable wire.

In some embodiments, by applying heat to the heat-shrink tube prefilled with sealing material may shrink the heat-shrink tube thereby forcing the sealing material into any gaps between the at least cable wire and the cable insulation for sealing the same.

In some embodiments, the method further comprises thermoset overmolding at least partially the heat-shrink tube and at least partially the section of the at least one cable wire protruding out of the cable insulation for forming a sealing element. Sealing of any gaps with the sealing material originally provided within the heat-shrink tube may prevent any thermoset material applied via the thermoset overmolding process from creeping into the cable insulation. Thus, the cable insulation can be maintained elastic and the cable wires can be prevented from any damage caused by thermoset material creeped into the cable insulation.

In some embodiments, the method may further comprise providing at least one electronic assembly within the sealing element and electrically connecting the at least one conductor with the at least one cable wire. In some embodiments, the electronic assembly is electrically connected to the at least one cable wire prior thermoset overmolding the electronic assembly with a thermoset material for sealing the electronic assembly. For example, the electronic assembly may be a printed circuit board.

In some embodiments, the sealing material is adapted to be at least partially liquid during the overmolding and sealing process for ensuring that the sealing material is able to flow into any gaps between the at least one cable wire and the cable insulation. After curing, the sealing material may be at least partially solid. In some embodiments, the sealing material may be adapted to stay at least partially soft.

In some embodiments, the sealing material is a hotmelt adhesive, wax or grease.

In some embodiments, the step of applying heat to the heat-shrink tube includes applying heat to the heat-shrink tube of a temperature in a range (depending on the sealing material) between about 90° C. and about 250° C.

In some embodiments, an inner layer of the heat-shrink tube is at least partially covered with the sealing material prior mounting the heat-shrink tube to the cable insulation and the at least one cable wire.

FIG. 1 shows a sectional view of an electrical device 100 incorporating teachings of the present disclosure. The electrical device 100 includes a cable wire 110 extending within a cable insulation 120 along a longitudinal direction 102 such that a section of the cable wire 110 at least partially longitudinally protrudes out of the cable insulation 120. A heat-shrink tube 130 is arranged such that, in a longitudinal direction, it at least partially surrounds the cable insulation 120 and at least partially surrounds the section of the cable wire 110 protruding out of the cable insulation 120. The heat-shrink tube 130 is at least partially filled with a sealing material 140 which is provided between the heat-shrink tube 130 and the cable insulation 120 and between the at least one cable wire 110 and the cable insulation 120 (see FIG. 2).

However, it is also in the scope of the present invention that the heat-shrink tube 130 directly contacts the cable insulation 120 without any sealing material 140 therebetween.

The sealing material 140 may be a hotmelt adhesive, such as, for example, wax, grease. The sealing material 140 may be configured to stay continuously soft and elastic. Alternatively, the sealing material 140 is configured to stay at least partially soft at least during the overmolding and sealing process but may be solid after the sealing material has filled any gaps between the at least one cable wire 110 and the cable insulation 120. In the latter case, the sealing material 140 is configured to include an elasticity to provide a suitably flexibility for the at least one cable wire 110 and/or the cable insulation 120.

The electrical device 100 of FIG. 1 further includes a sealing element 150 made of a thermoset material and preferably formed by a thermoset overmolding process. Specifically, as can be seen in FIG. 1, the sealing element 150 is arranged at least partially around the heat-shrink tube 130 and at least partially around the section of the cable wire 110 extending out of the cable insulation 120. In the embodiment shown in FIG. 1, the electrical device 100 further includes an electronic assembly 160, such as, for instance, a printed circuit board, that is electrically connected to the section of the cable wire 110 protruding out of the cable insulation 120. In some embodiments, the sealing element 150 is configured to entirely encapsulate the electronic assembly 160 for sealing the same against the ambient, such as, for example, air or a fluid. For instance, the electronic assembly 150 may be part of a fluid sensing device and may be drown in an aggressive fluid, such as urea.

Figure 2:
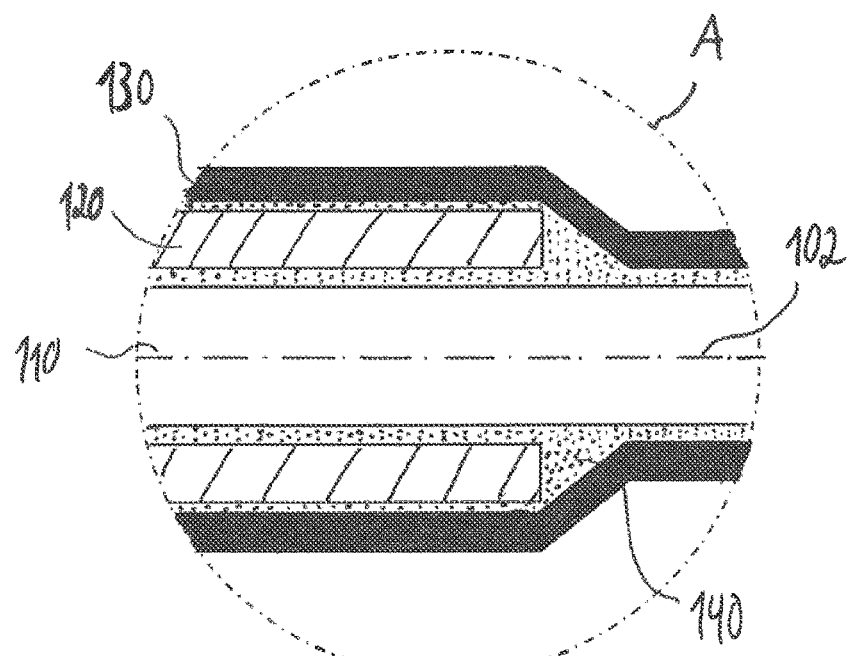
FIG. 2 shows an enlarged view of section A of FIG. 1.

FIG. 2 shows an enlarged view of section A (see dash-dotted circle) of FIG. 1. As can be seen in FIG. 2, the sealing material 140 is provided within a gap between the at least cable wire 110 and the cable insulation 120. In particular, the sealing material 140 can be forced into the portion between the at least one cable wire 110 and the cable insulation by heat-shrinking the heat-shrink tube 130. The resulting shrinkage of the heat-shrink tube 130 may change the inner volume of the heat-shrink tube thereby forcing the sealing material 140 into any gaps between the at least one cable wire 110 and the cable insulation 120.

For ensuring that the sealing material 140 is mainly forced into said gaps, the heat-shrink tube 130 may be first heated at the side where it surrounds the cable insulation 120. Then, the heat-shrink tube 130 may be heated from the side opposite thereto, namely where the heat-shrink tube 130 surrounds the at least one cable wire 110 protruding and extending out of the cable insulation 120, wherein the heating may be advanced in direction of the cable insulation 120.

Figure 3:
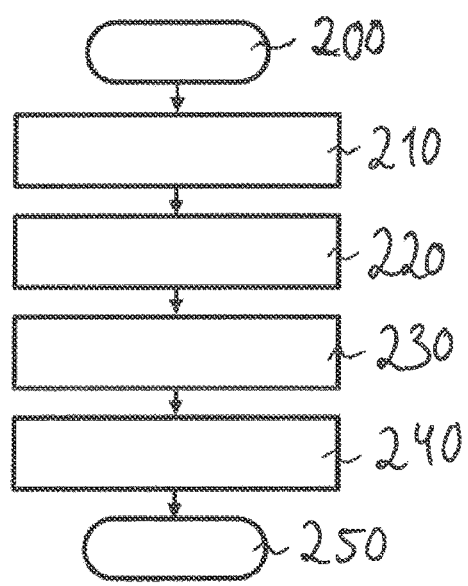
FIG. 3 shows an exemplary flow chart of a method for manufacturing an electrical device incorporating teachings of the present disclosure.

FIG. 3 shows an exemplary flow chart of a method for manufacturing an electrical device 100 incorporating teachings of the present disclosure. The method of FIG. 3 starts at step 200 and then proceeds to step 210 where at least one cable wire 110 and a cable insulation 120 arranged around the at least one cable wire 110 are provided such that a section of the at least one cable wire 110 at least partially longitudinally protrudes out of the cable insulation 120.

In a next step, a heat-shrink tube 130 is provided such that, in a longitudinal direction, it at least partially surrounds the cable insulation 120 and at least partially surrounds the section of the at least one cable wire 110 protruding out of the cable insulation 120. In addition, prior providing, the heat-shrink tube 130 is filled with a sealing material 140. Specifically, an inner layer of the heat-shrink tube 130 is at least partially covered with the sealing material 140.

In some embodiments, before providing the heat-shrink tube 130 about the cable insulation 120 and the section of the at least one cable wire 110 extending out of the cable insulation 120, the sealing material 140 may be applied to the portion where the heat-shrink tube 130 will be provided and mounted. Then, after applying the sealing material 140 to the cable insulation 120 and the cable wire 110, the heat-shrink tube 130 is provided around the sealing material 140.

Then, in a next step 220, heat is applied to the heat-shrink tube 130 such that the heat-shrink tube 130 at least partially shrinks thereby forcing the sealing material 140 into the cable insulation 120 for sealing any gaps between the cable insulation 120 and the at least one cable wire 110.

In a final step 240, the heat-shrink tube 130 and the section of the at least one cable wire 110 protruding out of the cable insulation 120 is thermoset overmolded with a thermoset material for forming a sealing element 150. Then, the method ends at step 250.

In some embodiments, an electronic arrangement 160, such as a printed circuit board, may also be embedded within the thermoset sealing element 150.

The electrical device 100 may be applicable to, for example, all kinds of sensors. For example, the electronic assembly 160 may carry an ultrasound transducer configured to be immersed in an aggressive liquid, such as urea. With the teachings of the present disclosure, a proper electrical connection between the electronic assembly 160 embedded within the sealing element 150 for sealing the same and an associated control unit may be ensured.

However, the scope of the present disclosure is not limited to the above-mentioned kind of sensors. For instance, the teachings may be also applicable to door handle sensors, inductive rotor position sensors, NOx-sensors, vibration sensors, and/or any other kind of sensor where a proper sealing of any wire harness is required and needed. Various embodiments of the present disclosure may find specific application in any electrical connection where a thermoset overmold process is be applied afterwards.

What is claimed is:

1. A method for manufacturing an electrical device, the method comprising:
    providing a cable wire and a cable insulation arranged around the cable wire such that a section of the cable wire at least partially longitudinally protrudes out of the cable insulation;
    providing a heat-shrink tube at least partially around the cable insulation and the section of the cable wire;
    providing a sealing material at least partially within the heat-shrink tube;
    molding a thermoset over at least a part of the heat-shrink tube surrounding the section of the cable wire; and
    applying heat to the heat-shrink tube to at least partially shrink the tube, thereby forcing the sealing material into the cable insulation to seal any gaps between the cable wire and the cable insulation.

2. The method according to claim 1, further comprising:
    forming a sealing element by a thermoset overmolding process, the sealing element arranged at least partially around the heat-shrink tube and the section of the cable wire;
    providing an electrical conductor within the sealing element; and
    electrically connecting the conductor with the cable wire.

3. The method according to claim 1, wherein the sealing material is at least partially solid after curing.

4. The method according to claim 1, wherein the sealing material comprises at least one of a hotmelt adhesive, wax, or grease.

5. The method according to claim 1, wherein applying heat to the heat-shrink tube includes applying heat to the heat-shrink tube of a temperature in a range from 90° C. to 250° C.

6. The method according to claim 1, wherein an inner layer of the heat-shrink tube is at least partially covered with the sealing material.

\* \* \* \* \*